3,110,680
ORTHOPHOSPHATE PHOSPHOR COMPOSITIONS
Hein Koelmans, Willem Lambertus Wanmaker, Anna Petronella Maria Cox, and Ameling Siepko Emmens, all of Eindhoven, Netherlands, assignors to North American Philips Company Inc., New York, N.Y., a corporation of Delaware
Filed June 27, 1957, Ser. No. 668,488
Claims priority, application Netherlands July 4, 1956
5 Claims. (Cl. 252—301.6)

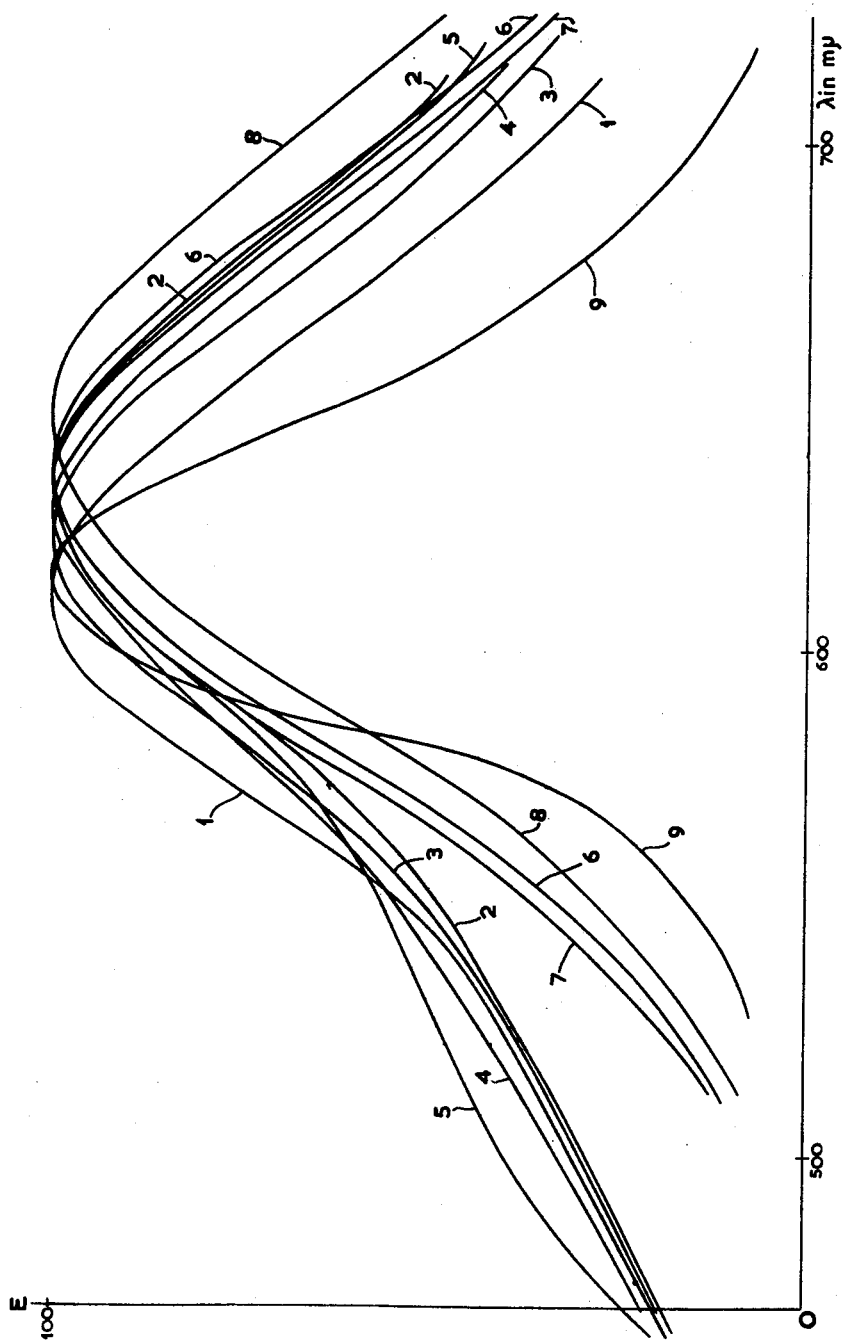

The invention relates to a source of radiation consisting of the combination of a gas and/or vapor discharge tube and a luminescent layer. The invention furthermore relates to a luminescent substance suitable for use in such a luminescent layer and to a method of producing such a substance.

It is known that β-calcium orthophosphate can be activated by bivalent tin; it then emits yellow-white light upon excitation by ultraviolet rays, which may be emitted, for instance, by high-pressure or low-pressure gas and/or vapor discharge tubes.

It is furthermore known that strontium orthophosphate can be activated by bivalent tin; it is then capable of emitting a radiation, the maximum of which lies at about 380 m$\mu$, upon excitation by ultraviolet rays, which may be emitted, for instance, by high-pressure or low-pressure gas and/or vapor discharge tubes.

One of the disadvantages inherent in the use of the afore-said orthophosphates of calcium and strontium, activated by bivalent tin, is due to the fact that the tin, at least for a large part, must be incorporated in its bivalent form in the substances. If, for some reason or other, oxidation takes place, so that the tin, although partly, changes into the tetravalent form the yield of the conversion is reduced. Such an oxidation can be avoided only with difficulty, when working up the luminescent substances in sources of radiation, since they are to be applied to a substratum, for example, the inner wall of a gas and/or vapor discharge tube, which requires the use of a binder. Then usually heating is performed in a furnace, which is freely accessible to air in order to burn the binder. This disadvantage is reduced strongly by the invention; at the same time, however, quite unexpected changes are obtained, which are very useful in the manufacture of source of radiation for particular purposes. These changes will be explained more fully hereinafter.

A source of radiation in accordance with the invention consists of the combination of a gas and/or vapor discharge tube and of a luminescent layer and is characterized in that this layer contains luminescent β-orthophosphate of calcium and/or strontium, activated by 0.1 to 10 mol. percent of bivalent tin, and in which such a portion of the calcium and/or strontium is replaced by at least one of the elements aluminum, magnesium and cadmium, that the sum of the number of aluminum, magnesium and cadmium atoms, divided by the sum of the number of atoms of calcium and strontium, lies between 0.02 and 0.50.

It should be noted that the number of mol. percent of tin is calculated on the mol. of phosphate.

By incorporating one or more of the elements aluminum, magnesium and cadmium the tin is protected, so that, upon heating the luminescent layer in an oxidizing atmosphere, a change-over from the bivalent form into the tetravalent form of the tin occurs less readily. Applied to a substratum, for instance, the inner wall of a gas and/or vapor discharge tube, the layer allows, without much objection, a heating in an oxidizing atmosphere, for example air, at a temperature between 400° C. and 600° C.

The quantity of the elements aluminum, magnesium and cadmium is preferably chosen to be such that the sum of the number of aluminum, magnesium and cadmium atoms, divided by the sum of the number of calcium and strontium atoms lies between 0.08 and 0.20.

The changes briefly referred to above may be explained as follows:

The β-calcium orthophosphate, activated by bivalent tin, produces, as stated above, a yellow-white radiation. Besides a strong maximum at about 630 m$\mu$, the emission curve exhibits a weaker additional emission, of which the maximum lies at about 500 m$\mu$. In many cases this additional emission will have little disturbing effect, but sometimes it is troublesome, since owing thereto the color of the emitted light is not red, which is desirable for the manufacture of lamps having a correct color reproduction. The surprising effect is that by incorporating one or more of the elements aluminum, magnesium or cadmium, this additional emission at about 500 m$\mu$ is suppressed. The degree of suppression varies with the added quantity of these elements. The larger the added quantity (within the aforesaid limits), the more drastic is the suppression. This has an additional advantage in that the emission at 630 m$\mu$ becomes stronger, since, apparently, the energy otherwise employed for the emission at 500 m$\mu$, is now used for the emission of which the maximum lies at 630 m$\mu$.

If use is made of magnesium and/or cadmium, either separately or in conjunction with aluminum, the maximum of the emission of 630 m$\mu$ is slightly shifted either to a shorter wavelength of about 600 m$\mu$ at a minimum or to a slightly longer wavelength, of about 650 m$\mu$ at a maximum. The extent of the shift varies with the quantity of magnesium and cadmium incorporated. With certain uses a slight shift will be desired and it is then advantageous to ensure the protection of the bivalent tin and the suppression of the by-emission by employing only aluminum or by employing aluminum for the major part.

The strontium orthophosphate, which is activated by bivalent tin, exhibits, as stated above, a maximum of the emission at about 380 m$\mu$. If this strontium phosphate is provided with aluminum, magnesium or cadmium or a combination of these elements in the aforesaid quantities, the ultraviolet emission disappears substantially completely and a new emission is produced in the visible part of the spectrum, corresponding substantially with the emission of β-calcium orthophosphate, in which one or more of these elements is incorporated. The maximum of this new emission also lies between about 620 and 650 m$\mu$.

The occurrence of this visible emission and the disappearance of the emission in the ultraviolet part of the spectrum may be accounted for by a structural change of the strontium orthophosphate such that the structure of the β-calcium orthophosphate is obtained. To this contributes the fact that calcium and strontium may be joined in an arbitrary ratio to obtain a β-orthophosphate with bivalent tin as an activator and one or more of the elements aluminum, magnesium and cadmium.

The influence of the addition of aluminum, magnesium or cadmium on the protection of the bivalent tin occurs in calcium orthophosphate, strontium orthophosphate or mixed calcium-strontium orthophosphates.

It has furthermore been found that 80 mol. percent of the total quantity of the aluminum, magnesium and cadmium may be replaced by zinc and that the same properties are then obtained, which are described above for the elements magnesium and cadmium.

It has been known that $\beta$-calcium orthophosphate can be activated by a combination of bivalent tin and bivalent manganese. Thus an emission spectrum is obtained, which has a greater emission in the red part of the spectrum as compared with the activation by tin only. Such an activation by manganese and tin is also possible with the substances used in the sources of radiation according to the invention. The quantity of manganese is chosen to lie between 0.1 and 5 mol. percent of the phosphate molecule.

The invention will now be described with reference to a few examples, whilst reference is made to the tables and the drawing, which shows, in a graph, a few emission curves, the wavelength being plotted on the abscissa in millimicrons and the light output on the ordinate in arbitrary units. The maximum emission is assumed to be 100 for each curve.

When producing the substances, the starting materials have the high degree of purity usually required for the production of the luminescent substances. It is common practice, as will be evident from the examples, to add a small excess of the compound introducing the phosphate group into the substance than that corresponding to the orthophosphate composition. It is thus better ensured that this composition will be obtained.

EXAMPLE I 5.00 g. of $CaCO_3$
5.55 g. of $(NH_4)_2HPO_4$
0.055 g. of SnO
0.84 g. of MgO are mixed and ground in a mechanical mortar for 10 minutes. The mixture is then heated at 500° C. to 600° C. for one hour in order to expel $NH_3$ and $H_2O$. The product obtained is then again ground for 20 minutes and heated in air at a temperature between 1000° C. and 1100° C. for about two hours. The powder obtained has a white appearance, but it does not yet luminesce. In order to obtain the luminescence, it is then heated in an atmosphere of nitrogen with 0.2 to 1% of hydrogen for half an hour. This heating also takes place at a temperature between 1000° C. and 1100° C. By the latter heating in the slightly reducing atmosphere the tin is converted from the tetravalent into the bivalent form. Subsequently, the powder obtained is caused to cool to about 400° C. in the nitrogen-hydrogen atmosphere and then to about room temperature in air. The product obtained has a white appearance and luminesces with a strongly yellow-white colour upon excitation by a radiation having a wavelength of 2537 A. The spectral distribution is indicated in the drawing by curve 1.

EXAMPLE II

The procedure described in Example I is carried out in the same manner, but instead of adding 0.84 g. of MgO, 1.72 g. of $CdCO_3$ is added. The emission of the substance obtained by this method is indicated by curve 2.

EXAMPLE III

The procedure of Example I is carried out in entirely the same manner, but instead of adding 0.84 g. of MgO, 0.41 g. of MgO and 0.85 g. of $CdCO_3$ are added. The emission of the substance obtained in this manner is indicated in the drawing by curve 3.

EXAMPLE IV 5.60 g. of $CaCO_3$
5.55 g. of $(NH_4)_2HPO_4$
0.055 g. of SnO
1.50 g. of $Al(NO_3)_3.9H_2O$ are mixed. The mixture is worked up in completely the same manner as described in the preceding examples. The substance obtained has an emission curve indicated in the drawing by 4.

EXAMPLE V

A mixture similar to that of Example IV is produced, but instead of adding 1.50 g. of aluminum nitrate a mixture of 0.75 g. of aluminum nitrate and 0.40 g. of MgO is added. This mixture is worked up in the same manner as described in the preceding examples. The luminescent substance obtained has an emission curve which coincides substantially with curve 1.

By way of comparison curve 5 of the drawing indicates the emission spectrum of the bivalent-tin-activated $\beta$-$Ca_3(PO_4)_2$. It clearly appears that the weak by-emission between 480 and 550 m$\mu$ has completely disappeared according to the curves 1 and 2, owing to the use of aluminum, magnesium or cadmium.

EXAMPLE VI 7.38 g. of $SrCO_3$
5.55 g. of $(NH_4)_2HPO_4$
0.055 g. of SnO
3.75 g. of $Al(NO_3)_3.9H_2O$ are mixed, this mixture is worked up in the same manner as described in the preceding examples. The substance obtained has an emission curve, indicated in the drawing by 6.

EXAMPLE VII

A mixture is produced as described in Example VI, but instead of adding 3.75 g. of aluminum nitrate, 0.84 g. of magnesium carbonate is added. This mixture is worked up in the same manner as described in the preceding examples; the luminescent substance obtained has an emission curve which is indicated by 7 in the drawing.

EXAMPLE VIII

A mixture is produced as described in Example VI, but instead of using 3.75 g. of aluminum nitrate, 1.72 g. of cadmium carbonate is employed. The mixture is treated in entirely the same manner. The luminescent substance obtained has an emission curve indicated by 8 in the drawing.

EXAMPLE IX

A mixture as described in Example VI is produced, but instead of adding 3.75 g. of aluminum nitrate, a mixture of 2.5 g. of $Al(NO_3)_3.9H_2O$, 0.2 g. of $MgCO_3$ and 0.40 g. of $CdCO_3$ is added; this mixture is treated in the same manner as described in the preceding examples.

The luminescent substance obtained has an emission curve, which coincides substantially with the emission curve 6 of the drawing.

EXAMPLE X 7.38 g. of $SrCO_3$
0.50 g. of $CaCO_3$
5.55 g. of $(NH_4)_2HPO_4$
0.055 g. of SnO
0.42 g. of $MgCO_3$ are mixed; this mixture is worked up in the same manner as described in the preceding examples. The luminescent powder obtained has an emission curve which coincides substantially with curve 7 of the drawing.

EXAMPLE XI

The starting material is a mixture as described in Example I but half of the added MgO is replaced by 0.81 g. of ZnO. The mixture is worked up in the same manner as described in Example I. The luminescent substance obtained has an emission curve which coincides substantially completely with the curve 1 of the drawing.

EXAMPLE XII 5.17 g. of $SrCO_3$
5.28 g. of $(NH_4)_2HPO_4$
9.38 g. of $Al(NO_3)_3 9H_2O$
0.07 g. of SnO
0.50 g. of $MnCO_3$ are mixed. The mixture obtained is worked up in the manner described in Example I. The emission curve of the luminescent substance obtained is indicated in the drawing by 9. The colour of the emitted light is more red owing to contraction of the emission spectrum.

In order to obtain a clear impression of the improvement in oxidation resistance Table I indicates the reduction of the luminous output in percents of the light output at room temperature for a few substances used for sources of radiation according to the invention and for unmodified β-calcium orthophosphate. The first horizontal line of the table indicates only the cations of the luminescent substances. The compounds containing magnesium or calcium have a mol. percentage composition of $$50Ca \cdot 10(Mg \text{ and/or } Cd) \cdot 40PO_4 \cdot 0.4Sn$$

The compound containing aluminum has a mol. percentage composition of: $56Ca \cdot 4Al \cdot 40PO_4 \cdot 0.4Sn$.

In order to determine the reduction in light output 200 mgs. of substance was heated for 15 minutes in air at the temperature indicated in the first vertical column.

Table I

[Reduction of light output in percents]

| Temp., ° C. | Ca | CaMg | CaCd | CaAl |
|---|---|---|---|---|
| 500 | 5 | 4 | 4 | 4 |
| 600 | 27 | 13 | 20 | 11 |
| 700 | 92 | 40 | 60 | 52 |

Table II indicates the reduction of light output in the same manner as in Table I for a compound having a mol. percentage composition of: $50Sr \cdot 10x \cdot 40PO_4 \cdot 0.4Sn$, wherein $x$ designates the sum of Al, Mg and Cd. However, since strontium orthophosphate does not emit light, calcium orthophosphate is taken for comparison purposes. With the experiments resulting in Tables I and II, the luminous output is measured by filtering out all radiation below 600 mμ.

Table II

[Reduction of light output in percents]

| Temp. in ° C. | Ca | SrAl | SrMg | SrCd |
|---|---|---|---|---|
| 500 | 5 | 1 | 0 | 0 |
| 600 | 27 | 4 | 0 | 0 |
| 700 | 92 | 16 | 8 | 0 |

In order to give an impression of the total luminous output of the modified strontium orthophosphate at room temperature, Table III indicates the luminous output for different compositions, i.e. with different mol. percentages of modifying cation. The tin concentration with all examples was 0.4 mol. percent. For comparison use was made of unmodified β-calcium orthophosphate with the same quantity of tin. The luminous output of this standard is taken to be 100%. Also with the experiments resulting in Table III all radiations below 600 mμ was filtered out.

Table III

[Composition in mol. percents]

| Sr | Al | Mg | Cd | PO₄ | Luminous output rel. to standard Ca₃(PO₄)₂ =100% |
|---|---|---|---|---|---|
| 60 | ---- | ---- | ---- | 40 | 0 |
| 58 | 2 | ---- | ---- | 40 | 61 |
| 55 | 5 | ---- | ---- | 40 | 107 |
| 50 | 10 | ---- | ---- | 40 | 106 |
| 40 | 20 | ---- | ---- | 40 | 109 |
| 30 | 30 | ---- | ---- | 40 | 104 |
| 58 | ---- | 2 | ---- | 40 | 103 |
| 56 | ---- | 4 | ---- | 40 | 114 |
| 54 | ---- | 6 | ---- | 40 | 116 |
| 50 | ---- | 10 | ---- | 40 | 121 |
| 40 | ---- | 20 | ---- | 40 | 108 |
| 30 | ---- | 30 | ---- | 40 | 10 |
| 57 | ---- | ---- | 3 | 40 | 20 |
| 54 | ---- | ---- | 6 | 40 | 37 |
| 50 | ---- | ---- | 10 | 40 | 97 |
| 40 | ---- | ---- | 20 | 40 | 15 |
| 50 | 5 | 5 | ---- | 40 | 100 |
| 45 | 10 | 5 | ---- | 40 | 97 |
| 40 | 5 | 10 | 5 | 40 | 80 |

What is claimed is:

1. A luminescent material capable of emitting radiation in the visible light region when subjected to excitement by ultra-violet radiation, said material consisting essentially of at least one compound selected from the group consisting of calcium β-orthophosphate and strontium β-orthophosphate in which such a portion of the member selected from the group consisting of calcium and strontium is replaced by at least one of the multivalent metals selected from the group consisting of aluminum, magnesium, and cadmium such that the sum of the number of aluminum, magnesium and cadmium atoms, divided by the sum of the number of atoms of calcium and strontium, lies between 0.02 and 0.50, said material being activated by from about 0.1 to 10 mol. percent of bivalent tin.

2. A luminescent material capable of emitting radiation in the visible light region when subjected to excitement by ultra-violet radiation, said material consisting essentially of at least one compound selected from the group consisting of calcium β-orthophosphate and strontium β-orthophosphate in which such a portion of the member selected from the group consisting of calcium and strontium is replaced by at least one of the multivalent metals selected from the group consisting of aluminum, magnesium, and cadmium such that the sum of the number of aluminum, magnesium and cadmium atoms, divided by the sum of the number of atoms of calcium and strontium, lies between 0.08 and 0.20, said material being activated by from about 0.1 to 10 mol. percent of bivalent tin.

3. A luminescent material capable of emitting radiation in the visible light region when subjected to excitement by ultra-violet radiation, said material consisting essentially of at least one compound selected from the group consisting of calcium β-orthophosphate and strontium β-orthophosphate in which such a portion of the member selected from the group consisting of calcium and strontium is replaced by at least one of the multivalent metals selected from the group consisting of aluminum, magnesium, and cadmium such that the sum of the number of aluminum, magnesium and cadmium atoms, divided by the sum of the number of atoms of calcium and strontium, lies between 0.02 and 0.50, said material being activated by from about 0.1 to 10 mol. percent of bivalent tin and from about 0.1 to 5 mol. percent of bivalent manganese.

4. A luminescent material capable of emitting radiation in the visible light region when subjected to excitement by ultra-violet radiation, said material consisting essentially of at least one compound selected from the group consisting of calcium β-orthophosphate and strontium β-orthophosphate in which such a portion of the member of the group selected from calcium and strontium is replaced by at least one of the multivalent metals selected from the group consisting of aluminum, magnesium, and cadmium and up to 80% of the total number of atoms of said multivalent metals being replaced by zinc that the sum of the number of aluminum, magnesium, cadmium and zinc atoms, divided by the sum of the number of atoms of calcium and strontium, lies between 0.02 and 0.50, said material being activated by from about 0.1 to 10 mol. percent of bivalent tin.

5. A luminescent material capable of emitting radiation in the visible light region when subjected to excitement by ultra-violet radiation, said material consisting essentially of $(Sr+Mg)_3(PO_4)_2$:Sn wherein the molar ratio of Mg to Sr is from 0.08 to 0.13, the molar ratio of Sr+Mg to 2P is slightly less than 3, the tin activator being present as bivalent tin in the ratio of Sn:2P of 0.01 to 0.04, and said phosphor having been fired at a temperature of from 1050 to 1100° C. in a slightly reducing atmosphere of nitrogen and a minor amount of hydrogen.

References Cited in the file of this patent

UNITED STATES PATENTS

| | | |
|---|---|---|
| 2,692,349 | Outweltjes | Oct. 19, 1954 |
| 2,716,081 | Marks | Aug. 23, 1955 |
| 2,716,082 | Smith | Aug. 23, 1955 |
| 2,750,344 | Kroger et al. | June 12, 1956 |
| 2,774,902 | Burns | Dec. 18, 1956 |
| 2,780,731 | Miller | Feb. 5, 1957 |
| 2,901,647 | Thomas et al. | Aug. 25, 1959 |

FOREIGN PATENTS

| | | |
|---|---|---|
| 512,154 | Great Britain | Aug. 30, 1939 |